US011560146B2

(12) United States Patent
Nageshrao et al.

(10) Patent No.: US 11,560,146 B2
(45) Date of Patent: Jan. 24, 2023

(54) INTERPRETING DATA OF REINFORCEMENT LEARNING AGENT CONTROLLER

(71) Applicant: Ford Global Technologies, LLC, Dearborn, MI (US)

(72) Inventors: Subramanya Nageshrao, Mountain View, CA (US); Bruno Sielly Jales Costa, Santa Clara, CA (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 16/778,444

(22) Filed: Jan. 31, 2020

(65) Prior Publication Data

US 2020/0307577 A1 Oct. 1, 2020

Related U.S. Application Data

(60) Provisional application No. 62/824,015, filed on Mar. 26, 2019.

(51) Int. Cl.
*B60T 8/32* (2006.01)
*G05D 1/00* (2006.01)
*G06F 7/00* (2006.01)
*G06F 17/00* (2019.01)
*B60W 30/14* (2006.01)
*G06K 9/62* (2022.01)
*G06N 3/08* (2006.01)
*G06V 20/56* (2022.01)

(52) U.S. Cl.
CPC ........... *B60W 30/14* (2013.01); *G05D 1/0088* (2013.01); *G06K 9/6218* (2013.01); *G06N 3/08* (2013.01); *G06V 20/56* (2022.01); *G05D 2201/0213* (2013.01)

(58) Field of Classification Search
CPC ..... B60W 30/14; G06V 20/56; G05D 1/0088; G05D 2201/0213; G06K 9/6218; G06N 3/08
USPC .......................................................... 701/93
See application file for complete search history.

(56) References Cited

U.S. PATENT DOCUMENTS

| 9,977,430 B2 | 5/2018 | Shalev-Shwartz et al. |
| 2018/0032082 A1* | 2/2018 | Shalev-Shwartz ........................... G01C 21/3602 |
| 2018/0275657 A1 | 9/2018 | You |

(Continued)

FOREIGN PATENT DOCUMENTS

| CN | 105189237 A | * 12/2015 | ............ B60W 30/12 |
| CN | 107862346 A | 3/2018 | |

OTHER PUBLICATIONS

English Translation for CN105189237A (Year: 2022).*

(Continued)

*Primary Examiner* — Mahmoud S Ismail
(74) *Attorney, Agent, or Firm* — Frank A. MacKenzie; Bejin Bieneman PLC

(57) ABSTRACT

The present disclosure describes systems and methods that include calculating, via a reinforcement learning agent (RLA) controller, a plurality of state-action values based on sensor data representing an observed state, wherein the RLA controller utilizes a deep neural network (DNN) and generating, via a fuzzy controller, a plurality of linear models mapping the plurality of state-action values to the sensor data.

12 Claims, 8 Drawing Sheets

(56) References Cited

U.S. PATENT DOCUMENTS

| | | |
|---|---|---|
| 2018/0348763 A1 | 12/2018 | Jiang et al. |
| 2020/0065665 A1* | 2/2020 | Nageshrao ........... G06N 3/0454 |
| 2020/0150672 A1* | 5/2020 | Naghshvar ........... G06N 3/0454 |
| 2020/0193271 A1* | 6/2020 | Allen .................. G06F 11/3452 |

OTHER PUBLICATIONS

Plamen Angelov, Simpl_eTS: A Simplifed Method for Learning Evolving Takagi-Sugeno Fuzzy Models, 2005, IEEE, 1068-1073 (Year: 2005).*

Palade, V, et al., "Interpretation of Trained Neural Networks by Rule Extraction," Fuzzy Days 2001, LNCS 2206, 2001, pp. 152-161.

* cited by examiner

INTERPRETING DATA OF REINFORCEMENT LEARNING AGENT CONTROLLER

CROSS-REFERENCE TO RELATED APPLICATIONS

This application is a non-provisional of, and claims priority to, U.S. Provisional Application No. 62/824,015, filed on Mar. 26, 2019, which application is hereby incorporated herein by reference in its entirety.

BACKGROUND

A reinforcement learning agent is a neural network technique. One of the challenges of using such an agent is interpreting its output data.

DETAILED DESCRIPTION

Figure 1:
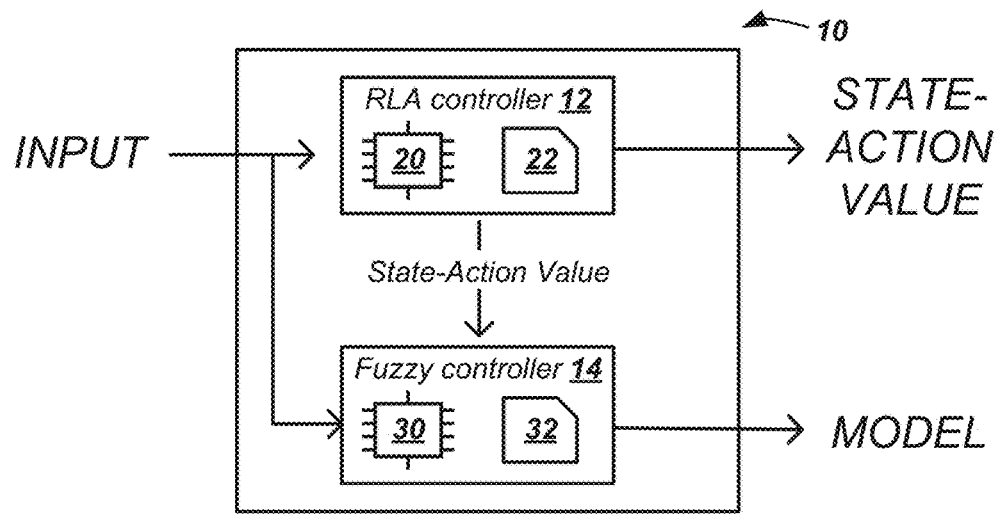
FIG. 1 is a schematic diagram illustrating a machine learning system comprising a reinforcement learning agent (RLA) controller and a fuzzy controller.

A machine learning system is described that includes a (deep) reinforcement learning agent (RLA) controller and a fuzzy logic controller (e.g., hereafter, simply referred to as a fuzzy controller). According to an example, a method comprises calculating, via a reinforcement learning agent (RLA) controller, a plurality of state-action values based on sensor data representing an observed state, wherein the RLA controller utilizes a deep neural network (DNN) and generating, via a fuzzy controller, a plurality of linear models mapping the plurality of state-action values to the sensor data.

In other features, the plurality of state-action values correspond to an optimal policy generated during reinforcement learning training.

In other features, the method includes actuating an agent based on at least one of the plurality of state-action values or the plurality of linear models.

In other features, the agent comprises an autonomous vehicle.

In other features, the method includes actuating the agent further comprises adjusting a speed of the autonomous vehicle based on at least one of the plurality of state-action values or the plurality of linear models.

In other features, the plurality of linear models comprise a set of IF-THEN rules mapping the plurality of state-action values to the sensor data.

In other features, the fuzzy controller uses an Evolving Takagi-Sugeno (ETS) model to generate the plurality of linear models.

In other features, the method includes determining, via the fuzzy controller, one or more data clusters corresponding to the sensor data, wherein each of the one or more data clusters comprises a focal point and a radius.

According to another example, a system includes at least one processor and at least one memory. The at least one memory stores instructions executable by the at least one processor such that the at least one processor is programmed to: calculate, via a deep neural network, a plurality of state-action values based on sensor data representing an observed state and generate a plurality of linear models mapping the plurality of state-action values to the sensor data.

In other features, the plurality of state-action values correspond to an optimal policy generated during reinforcement learning training.

In other features, the processor is further programmed to actuate an agent based on at least one of the plurality of state-action values or the plurality of linear models.

In other features, the agent comprises an autonomous vehicle.

In other features, the processor is further programmed to adjust a speed of the autonomous vehicle based on at least one of the plurality of state-action values or the plurality of linear models.

In other features, the plurality of linear models comprise a set of IF-THEN rules mapping the plurality of state-action values to the sensor data.

In other features, the processor is further programmed to generate the plurality of linear models using an Evolving Takagi-Sugeno (ETS) model.

In other features, the processor is further programmed to determine one or more data clusters corresponding to the sensor data, wherein each of the one or more data clusters comprises a focal point and a radius.

According to another example, an autonomous agent includes at least one processor and at least one memory. The at least one memory stores instructions executable by the at least one processor such that the at least one processor is programmed to: calculate, via a deep neural network, a plurality of state-action values based on sensor data representing an observed state, generate a plurality of linear models mapping the plurality of state-action values to the sensor data, and actuate the autonomous agent based on at least one of the plurality of state-action values or the plurality of linear models.

In other features, the plurality of state-action values correspond to an optimal policy generated during reinforcement learning training.

In other features, the autonomous agent comprises an autonomous vehicle.

In other features, the plurality of linear models comprise a set of IF-THEN rules mapping the plurality of state-action values to the sensor data.

Reinforcement Learning (RL) is a form of goal-directed machine learning. For example, an agent can learn from direct interaction with its environment without relying on explicit supervision and/or complete models of the environment. Reinforcement learning is a framework modeling the interaction between a learning agent and its environment in terms of states, actions, and rewards. At each time step, an agent receives a state, selects an action based on a policy, receives a scalar reward, and transitions to the next state. The state can be based on one or more sensor inputs indicative of the environmental data. The agent's goal is to maximize an expected cumulative reward. The agent may receive a positive scalar reward for a positive action and a negative scalar reward for a negative action. Thus, the agent "learns" by attempting to maximize the expected cumulative reward. While the agent is described within the context of a vehicle herein, it is understood that the agent may comprise any suitable reinforcement learning agent.

Fuzzy logic can be used to estimate input-output functions. For example, using fuzzy logic, a system can estimate a function without a mathematical model of how outputs depend on the inputs. Instead, the system a set of linguistic rules and/or memory associations can be used for mapping outputs to inputs.

As described herein, a system can include a reinforcement learning agent controller and a fuzzy controller. The reinforcement learning agent controller receives input data. For example, the input data may comprise sensor data received from one or more sensors disposed about an agent indicative of an environment proximate to the agent. The reinforcement learning agent controller generates an output based on the received input data. For instance, the output may be a control signal to control the agent. The fuzzy controller receives the input data, e.g., sensor data, and the output data generated by the reinforcement learning agent controller. Using the input data and the output data, the fuzzy controller generates a rule-base model to approximate the mapping of the output to the input. The rule-base model can comprise a nonlinear model composed of linear portions.

Turning now to the figures, wherein like reference numerals indicate similar or like features or functions, a machine learning system 10 is described. In the description that follows, the system 10 is explained in the context of an autonomous driving; however, it should be appreciated that the system 10 is not so limited (e.g., numerous other problem-solving contexts also exist).

According to the example explained herein, system 10 utilizes a reinforcement learning agent (RLA) controller 12 and a fuzzy controller 14 in series to solve a machine learning problem. For example, using sensed data as input, the RLA controller 12 may determine an optimization thereof using a reward and/or penalty scheme and generate an output representing one or more state-action values (Q-values), e.g., an RLA dataset. Thus, in the disclosed system 10, the fuzzy controller 14 serves as an interpretive model. For example, the fuzzy controller 14 may receive the RLA dataset and the sensed data representative of an observed state as input. Thus, as described herein, the system 10 first utilizes the RLA controller 12 to determine optimization of a dynamic model, then the fuzzy controller 14 to process the output of the RLA controller 12 to provide information useful to engineers, designers, and the like that assists them in creating and tuning such dynamic models.

According to one non-limiting example, system 10 may be a computer or any other computing device comprising hardware and software, firmware, etc., wherein the hardware comprises one or more processors and memory. For example, system 10 may be a computer module (e.g., a line-replaceable unit or LRU). Or system 10 may be a circuit card or a portion thereof that forms part of a computer module—e.g., interconnected with other circuit cards in the module. Still other examples exist. In FIG. 1, system 10 is illustrated as including electronic control units (ECUs) labeled as RLA controller 12 and fuzzy controller 14. As explained below, this is merely an example. For instance, in other examples, the RLA and fuzzy controllers 12, 14 may be embodied using a common processor and memory.

RLA controller 12 includes a set of instructions (e.g., software instructions) that include receiving data, determining an optimization of the received data, and generating one or more state-action values as output. According to at least one non-limiting example, the RLA controller 12 further comprises hardware: namely, at least one processor 20 and at least one memory 22. Processor 20 may be any type of device capable of processing electronic instructions, non-limiting examples including a microprocessor, a microcontroller or controller, an application specific integrated circuit (ASIC), etc.—just to name a few. In general, processor 20 may be programmed to execute digitally-stored instructions, which may be stored in memory 22, which enable the system 10 to solve a machine learning problem. Non-limiting examples of instructions will be described in the one or more processes described below.

Memory 22 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 22 may store one or more computer program products which may be embodied as software, firmware, or other programming instructions executable by the processor 20.

Fuzzy controller 14 includes a set of instructions (e.g., software instructions) that include receiving a dataset from RLA controller 12 and generating a set of fuzzy rules based on the received dataset. According to at least one non-limiting example, the fuzzy controller 14 further comprises hardware: namely, at least one processor 30 and at least one memory 32. In at least one example, the physical attributes of the processor 30 may be identical to those of processor 20, and in at least one example, the physical attributes of memory 32 may be identical to that of memory 22; therefore, these physical attributes will not be re-described here. That said, it should be appreciated that the instructions of fuzzy controller 14 may differ in part or in its entirety from that of RLA controller 12. Thus, any pre-programmed processor may differ in at least its instructions; processors embodied as ASICs or the like may differ with respect to software and hardware.

Figure 2:
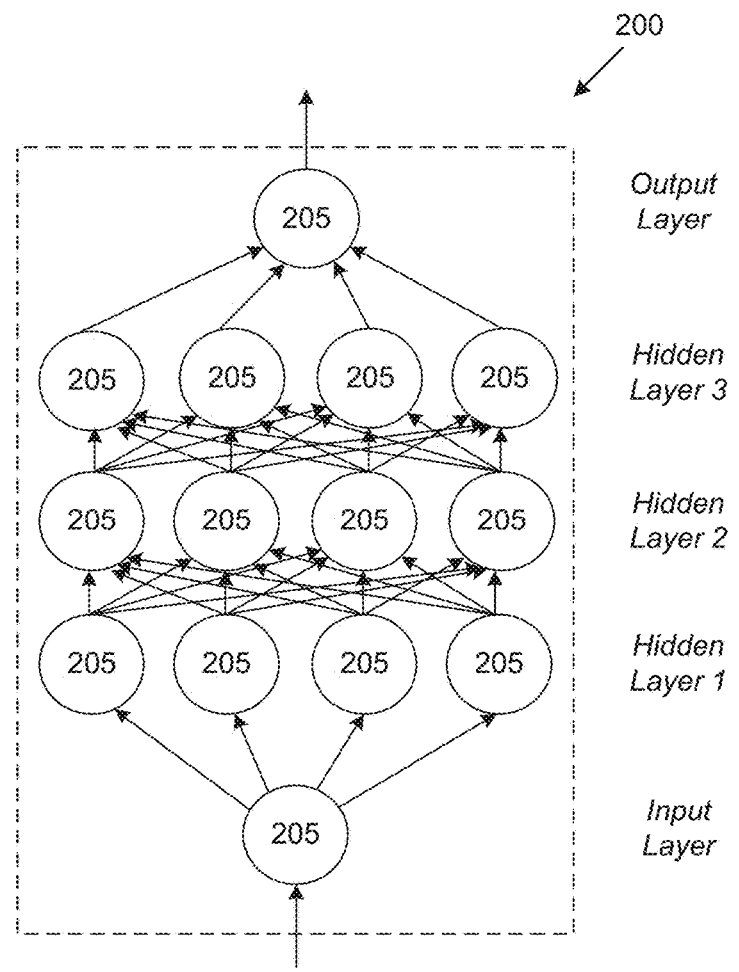
FIG. 2 is a diagram of an example deep neural network.

FIG. 2 is a diagram of an example deep neural network (DNN) 200. The DNN 200 can be a software program that can be loaded in memory 22 and executed by the processor 20, for example. In an example implementation, the DNN 200 can include any suitable neural network capable of employing reinforcement learning techniques. The DNN 200 includes multiple neurons 205, and the neurons 205 are arranged so that the DNN 200 includes an input layer, one or more hidden layers, and an output layer. Each layer of the DNN 200 can include a plurality of neurons 205. While FIG. 2 illustrates three (3) hidden layers, it is understood that the DNN 200 can include additional or fewer hidden layers. The input and output layers may also include more than one (1) neuron 205.

The neurons 205 are sometimes referred to as artificial neurons 205, because they are designed to emulate biological, e.g., human, neurons. A set of inputs (represented by the arrows) to each neuron 205 are each multiplied by respective weights. The weighted inputs can then be summed in an input function to provide, possibly adjusted by a bias, a net input. The net input can then be provided to activation function, which in turn provides a connected neuron 205 an output. The activation function can be a variety of suitable functions, typically selected based on empirical analysis. As illustrated by the arrows in FIG. 2, neuron 205 outputs can then be provided for inclusion in a set of inputs to one or more neurons 205 in a next layer.

The DNN 200 can be trained to accept sensor data as input and generate a state-action value, e.g., reward value, based on the input. The DNN 200 can be trained with training data, e.g., a known set of sensor inputs, to train the agent for the purposes of determining an optimal policy. Weights can be initialized by using a Gaussian distribution, for example, and a bias for each neuron 205 can be set to zero. Training the DNN 200 can including updating weights and biases via suitable techniques such as back-propagation with optimizations.

Figure 3:
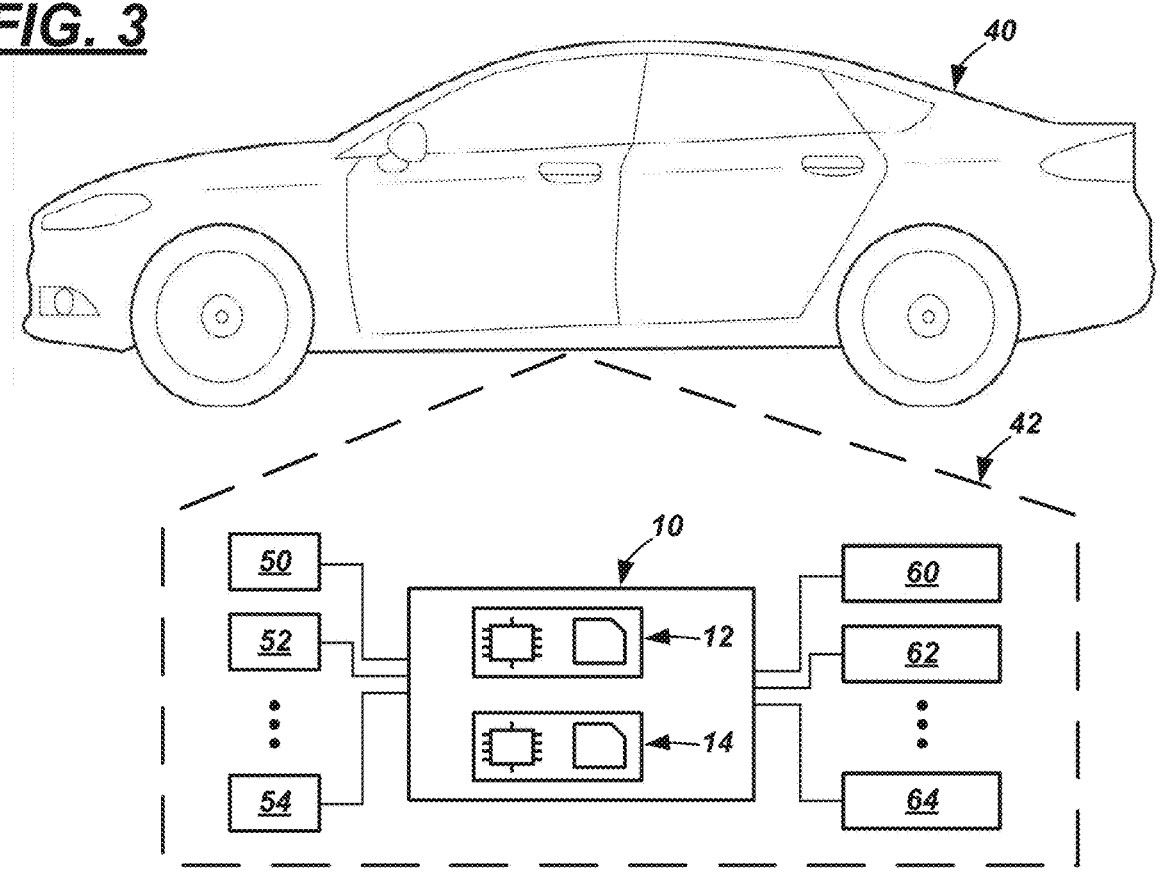
FIG. 3 is a schematic diagram of an ego vehicle using the machine learning system of FIG. 1.

Turning to FIG. 3, system 10 is shown-by way of example-embodied in a vehicle 40 comprising an autonomous driving system 42. Vehicle 40 is illustrated as a passenger vehicle; however, vehicle 40 could be any other suitable vehicle type, including a truck, a sports utility vehicle (SUV), a recreational vehicle, a bus, aircraft, marine vessel, or the like that comprises the autonomous driving system 42. In at least one example, the vehicle 40 is configured to operate in at least one of a plurality of autonomous modes, as defined by the Society of Automotive Engineers (SAE) (which has defined operation at levels 0-5). For example, vehicle 40 may receive and process two- and/or three-dimensional data of its surroundings and further may be programmed and/or configured to store and execute logic instructions embodied in hardware, software, firmware, a combination thereof, or the like, and to enable vehicle 40 to operate with some user assistance (partial autonomy) or without any user assistance (full autonomy). For example, according to levels 0-2, a human driver monitors or controls the majority of the driving tasks, often with no help from the vehicle 40. For example, at level 0 ("no automation"), a human driver is responsible for all vehicle operations. At level 1 ("driver assistance"), vehicle 40 sometimes assists with steering, acceleration, or braking, but the driver is still responsible for the vast majority of the vehicle control. At level 2 ("partial automation"), vehicle 40 can control steering, acceleration, and braking under certain circumstances without human interaction. At levels 3-5, vehicle 40 assumes more driving-related tasks. At level 3 ("conditional automation"), vehicle 40 can handle steering, acceleration, and braking under certain circumstances, as well as monitoring of the driving environment. Level 3 may require the driver to intervene occasionally, however. At level 4 ("high automation"), vehicle 40 can handle the same tasks as at level 3 but without relying on the driver to intervene in certain driving modes. At level 5 ("full automation"), vehicle 40 can handle all tasks without any driver intervention. In at least one example, vehicle 40 is configured to operate according to one of levels 2-5.

Autonomous driving system 42 may comprise one or more sensors 50, 52, 54, system 10 (previously described), and one or more computers 60, 62, 64. Sensors 50-54 respectively may comprise vehicle instrument cluster sensor(s) 50, one or more vehicle wheel sensors 52 (e.g., measuring vehicle speed), and a radio detection and ranging (RADAR) sensor 54. It should be appreciated that system 40 does not require three sensors; e.g., it may have more or fewer sensors. And the instrument cluster sensor(s) 50, the wheel sensors 52, and the RADAR sensor 54 are merely examples. A non-exhaustive and non-limiting list of vehicle sensors 50-54 could include one or more of a vehicle pitch sensor, a vehicle roll sensor, a vehicle yaw sensor, a motion sensor, a proximity sensor, a laser identification detection and ranging (LIDAR) sensor, an imaging sensor (e.g., a complementary metal oxide semiconductor (CMOS) sensor, a charge-coupled sensor (CCDs), an image intensifying sensor, etc.), an infrared sensor, a thermal sensor, a short-, medium-, or long-range wireless signal sensor, a vehicle position sensor (e.g., a Global Positioning System (GPS) and a Global Navigation Satellite System (GLONASS) sensor), a door-ajar sensor, a vehicle acceleration sensor, a vehicle braking sensor, and a vehicle steering sensor, just to name a few examples.

As shown in FIG. 3, this sensor data may be received by system 10. According to one example of autonomous driving system 42, system 10 may provide data to the computers 62-64.

According to one non-limiting example, computers 60-64 respectively may comprise a vehicle engine control computer (60), a vehicle braking system computer (62), and a vehicle steering control computer (64), wherein each of the computers 60-64 execute instructions to carry out at least one autonomous or partially-autonomous vehicle operation (e.g., such as adaptive cruise control (ACC), lane keeping assist, lane departure warning, forward-collision warning, automated emergency braking, pedestrian detection, and blind spot warning, just to name a few examples). It should be appreciated that system 42 does not require three computers coupled to the output of system 10; e.g., it may have more or fewer computers. And the vehicle engine control computer 60, the vehicle braking system computer 62, and the vehicle steering control computer 64 are merely examples. A non-exhaustive and non-limiting list of vehicle computers 60-64 could include a body control module (BCM), a powertrain control module (PCM), a power transfer unit (PTU), and a suspension control module, just to name a few examples. As will be described more below, by system 10 providing an output to one or more of computers 60-64, system 10 may initiate a vehicle function (e.g., such as controlling vehicle acceleration, controlling vehicle braking, and/or controlling vehicle steering).

Figure 4:
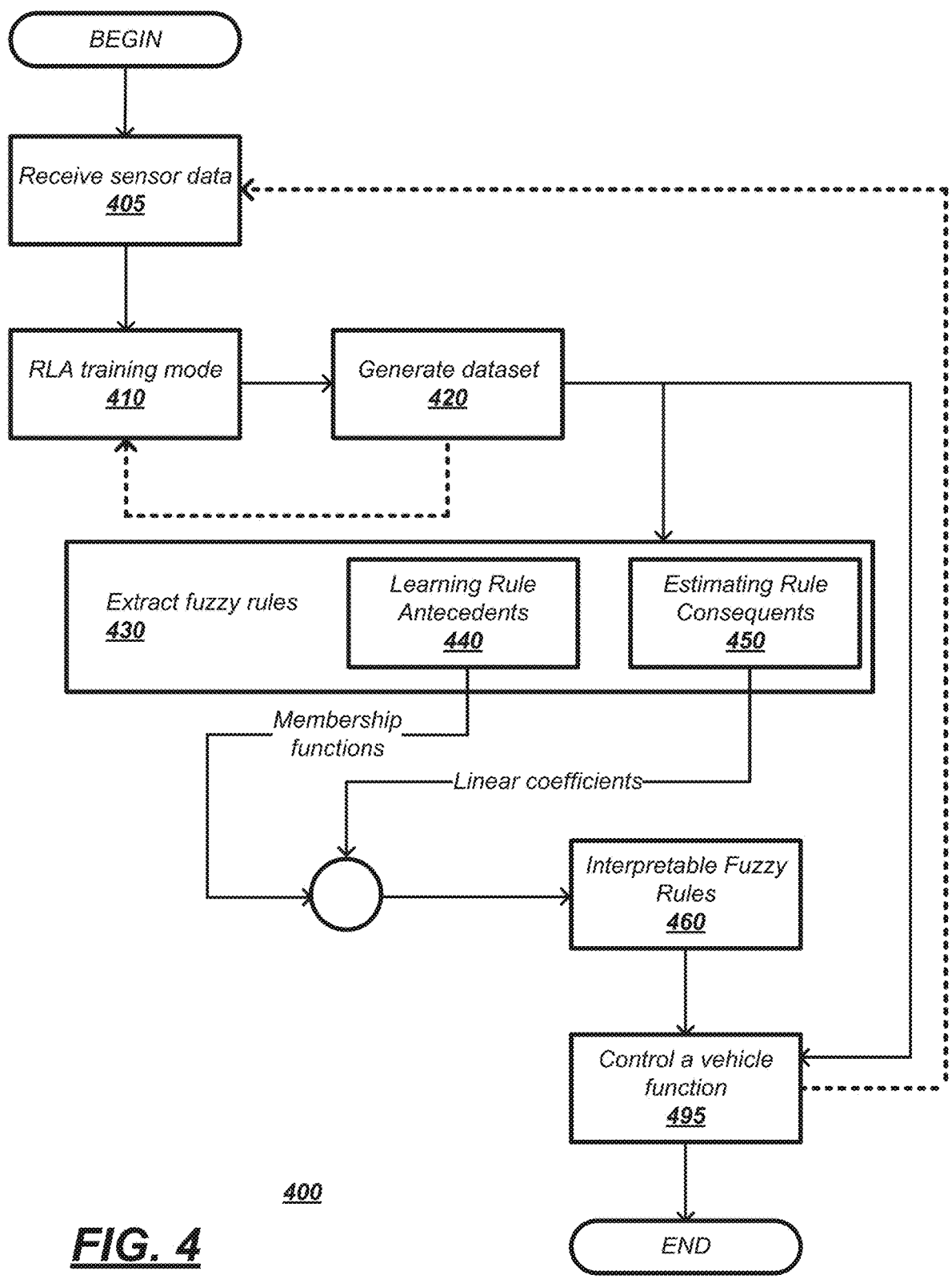
FIG. 4 is a flow diagram illustrating a process executable by the machine learning system of FIG. 1.

Turning now to FIG. 4, an overview of a process 400 is shown for operating machine learning system 10. By way of example only and not to be limiting—e.g., to illustrate an implementation-process 400 is described with respect to autonomous system 42 executing an adaptive cruise control (ACC) system. In other examples of process 400, the environment of system 10 may differ or system 10 may be in a vehicle but used to perform different vehicle functions instead (e.g., other than ACC); thus, vehicle 40 operating in an ACC mode in process 400 is merely an example.

Figure 5:
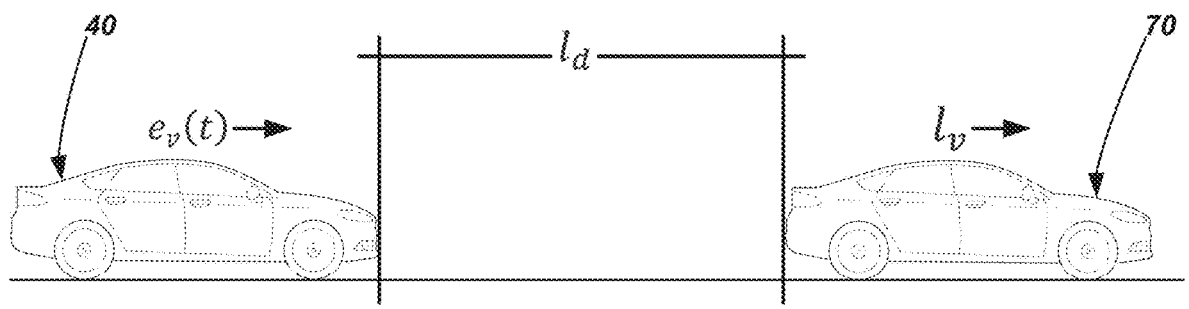
FIG. 5 is a schematic view of an ego vehicle and a lead vehicle, wherein the ego vehicle is in an adaptive cruise control (ACC) mode.

In the context of the present example, vehicle 40 (e.g., also called the 'ego (e) vehicle') may be following a lead (l) vehicle 70 as shown in FIG. 5. In the ACC mode, vehicle 40 attempts to maintain a suitable distance ($l_d$) between it and vehicle 70—e.g., by controlling its velocity ($e_v(t)$) and based on a velocity (Iv) of lead vehicle 70, current driving conditions (e.g., speed of vehicle 40, roadway conditions (dry, wet, icy, etc.), current weather conditions (windy, snowy, etc.), etc.). For example, when lead vehicle 70 slows down, vehicle 40 may slow down-attempting to maintain an appropriate distance therebetween. And when vehicle 70 speeds up, vehicle 40 may accelerate—e.g., provided its speed does not surpass a user's preselected maximum cruise speed.

Returning to FIG. 4, process 400 may begin with block 405. In block 405, various sensor data inputs may be received by system 10. This sensor data may pertain to the vehicle 40, as well as the lead vehicle 70, and may be relative to operating the autonomous system 42 (which may be executing ACC). For example, sensor data may comprise one or more ACC signals from instrument cluster 50 (e.g., indicating that the user has initiated an ACC mode, indicating a desired ACC speed, etc.), a current speed of vehicle 40 from wheel sensors 52, and depth data from RADAR sensor 54 (e.g., which may be used to determine a distance between vehicles 40, 70, a speed of vehicle 70, etc.). As will be described more below, this sensor data may be used as an input into a dynamic vehicle model with which the RLA controller 12 operates.

In block 410, system 10 may execute an RLA training mode in accordance with a vehicle dynamics model. For instance, block 410 may comprise training RLA controller 12 to learn a policy (In) using a predetermined quantity of episodes (E), wherein each episode comprises a predetermined quantity (S) of samples. For example, RLA controller 12 typically may execute E=500-2000 episodes (in a training mode) (e.g., in one at least example, E=1500 episodes). Each training episode typically comprises samples (S)—e.g., 200<S<800 samples unless there is a collision (e.g., $l_d \leq 0$ meters (m)) or the relative distance between the vehicles 40, 70 is greater than a predetermined threshold $l_{THR}$ (e.g., $l_d > l_{THR}$; e.g., $l_{THR}$=150 m). Thus, a collision or a relative distance greater than the threshold ($l_{THR}$) may terminate the respective episode.

An example of one illustrative vehicle dynamics model is shown in Equations (1)-(3). E.g., Equations (1) and (2) illustrate a unit mass double integrator.

$$x_1(t+1) = x_1(t) + x_2(t)\Delta t \quad \text{Equation (1)}.$$

$$x_2(t+1) = x_2(t) + u(t)\Delta t \quad \text{Equation (2)}.$$

Wherein $x_1$ is a position of the vehicle 40, wherein $x_2$ is a vehicle velocity (in the example which follows limited to [0 meters/second (m/s), 32 m/s], wherein u is an input acceleration (in the example which follows limited to [−2 m/s$^2$, 2 m/s$^2$]). In this illustrative example, a sampling rate of 4 Hz was used.

During the RLA training mode, Equation (3) may be used to define acceleration with respect to time.

$$u(t) = \mu(s|\theta^\mu) + \mathcal{N} \quad \text{Equation (3)}.$$

Wherein $\mathcal{N}$ is an exploration noise, wherein $\mu(s|\theta^\mu)$ is a deterministic policy network that is a function of a system state (s) and an unknown parameter vector ($\theta^\mu$). For example, in an ACC mode, state s may be defined as [$d_r$, $\Delta v$, u(t−1)], wherein $d_r$ represents relative distance, $\Delta v$ represents relative velocity, and u(t−1) is an applied acceleration at a time (t−1). In the training mode, the lead vehicle 70 may assume random distances relative to vehicle 40 and may assume random velocities. As part of the training mode, each episode randomly may apply a different acceleration profile to the lead vehicle 70 so that the RLA controller 12 learns how to react to different circumstances.

In the example that follows, an Adam Method of Stochastic Optimization can be used (e.g., wherein an actor network learning rate may be $10^{-4}$, a critic network learning rate may be $10^{-3}$, and a discount factor ($\gamma$) may be 0.95, wherein each of the actor and critic networks may have two hidden layers with each hidden layer having 64 rectified non-linear units) to train RLA controller 40 (e.g., optimize the parameter and/or weights).

In this example, the RLA controller 12 may pertain to optimizing a velocity of vehicle 40 with respect to lead vehicle 70. According to a non-limiting example, for each sample (S), RLA controller 12 may calculate several equally-weighted rewards ($r_v$, $r_d$, $r_a$), the rewards respectively corresponding to the velocity ($e_v$) of vehicle 40 and the velocity ($l_v$) of vehicle 70, the distance ($l_d$) between vehicles, 40, 70, and a change in acceleration ($\Delta a_e$) of vehicle 40. According to the example, RLA controller 12 may utilize Equations (4), (5), and (6).

$$r_v = e^{-\left[\frac{(e_v - l_v)^2}{e_{vmax}}\right]} - 1 \quad \text{Equation (4)}$$

Wherein $e_{vmax}$ is a maximum velocity of vehicle 40 (e.g., typically a user-selected cruise control speed in the ACC mode).

$$r_d = e^{-\left[\frac{(l_d - T_h d_{thr})^2}{2 T_h d_{thr}}\right]} - 1 \quad \text{Equation (5)}$$

Wherein $T_h$ is a headway parameter (i.e., a measurement of time between vehicles 40, 70; e.g., the time it takes vehicle 40 to traverse distance $l_d$ (FIG. 4) based on a current speed of vehicle 40 (typically in seconds (s)), wherein $d_{thr}$ is a determined or predetermined distance that represents a distance between vehicles 40, 70 in order for vehicle 40 to avoid a rear-end collision with vehicle 70. A non-limiting example of headway time $T_h$ is a value within [1 s, 2 s]; e.g., in the illustrative calculations described below (as an example), a value of $T_h$=1.5 was used. And non-limiting examples of distance $d_{thr}$ are two car-lengths, three car-lengths, etc.

$$r_a = e^{-\left[\frac{(\Delta a_e)^2}{2 * a_{max}}\right]} - 1 \quad \text{Equation (6)}$$

Wherein $\Delta a_e$ can be correlated to $\Delta a_e = a_e(t) - a_e(t-1)$, wherein $a_{max}$ is a predetermined maximum allowable acceleration for the vehicle 40.

To illustrate an example computation, FIG. 5 shows velocity rewards ($r_v$) when $l_v$=20 m/s (meters/second). Maximum reward for a given sample is located at a local maxima $r_{v-max}$.

Figure 6:
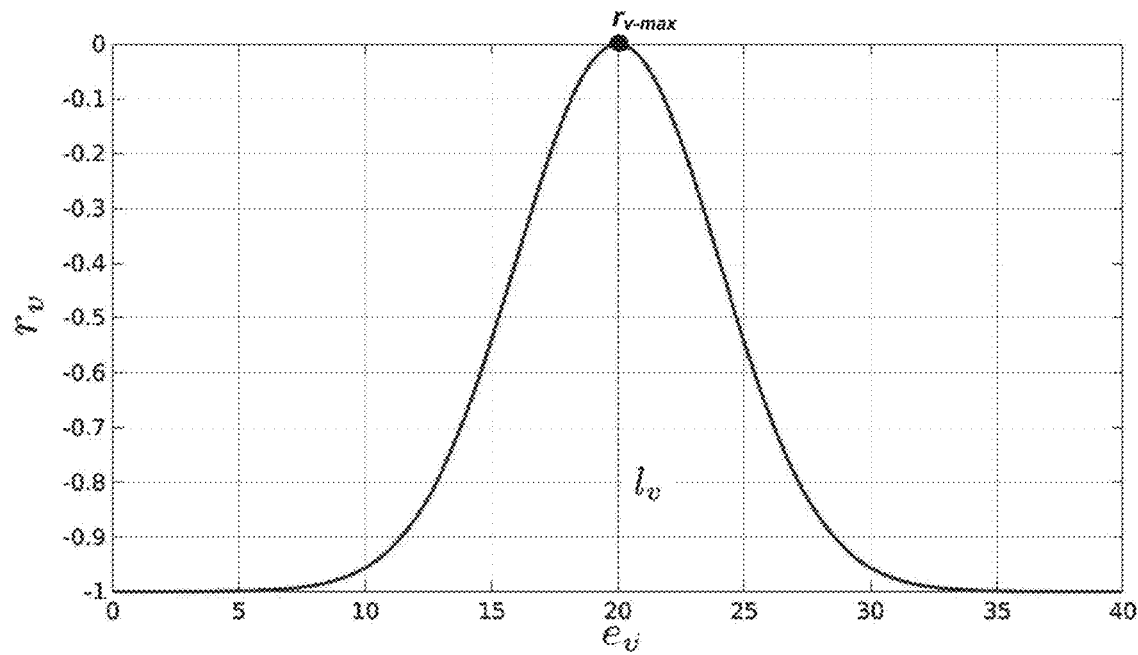
FIG. 6 is a graphical depiction of a velocity reward curve which may be used by the RLA controller in a training mode.
Figure 7:
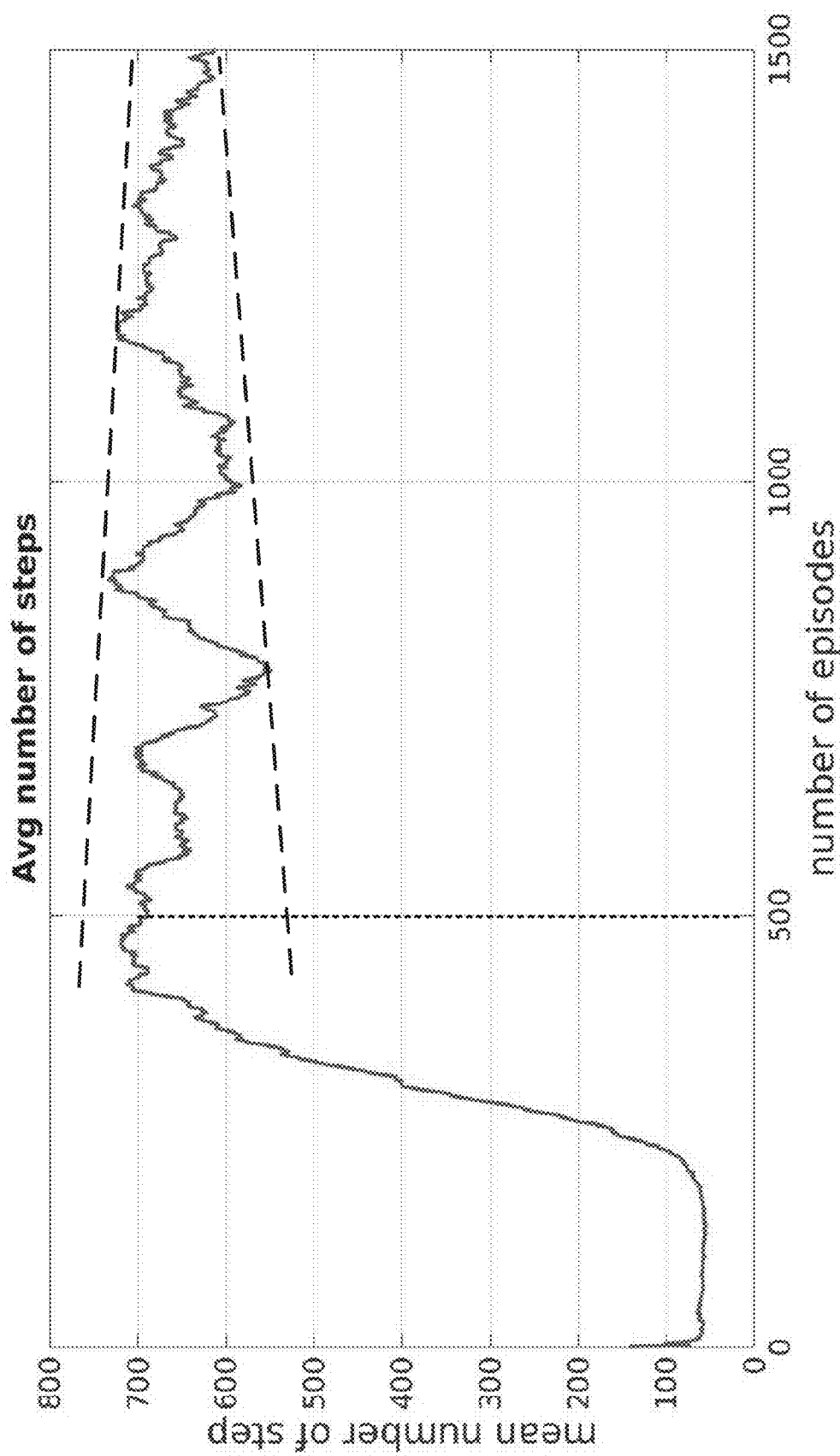
FIG. 7 is a graphical depiction of an average number of steps with respect to episodes in a training mode of the RLA controller.

FIG. 7 illustrates that approximately 500 episodes may be needed for the policy (i) to be learned by the RLA controller 12. Further, convergence may occur thereafter. For instance, in FIG. 6, following 1500 episodes, additional convergence has occurred to sufficiently train the RLA controller 12 to a desirable performance. As will be shown below, the performance of this machine learning controller out-performs existing techniques.

Returning to FIG. 4, in block 420, RLA controller 12 outputs data (e.g., a state-action value, RLA dataset). Thus, as used herein, an RLA dataset comprises a plurality of state-action values provided as output by an RLA controller 12; in some instances, this occurs during a training mode. In other instances, it may occur during an evaluation mode (e.g., which follows a training mode). Continuing with the present example, the RLA dataset may comprise data that comprises the rewards ($r_v$, $r_d$, $r_a$), the corresponding velocity values of vehicles 40, 70 ($l_v$, $e_v$), the corresponding distances between vehicles 40, 70 ($l_d$), the corresponding changes in acceleration of vehicle 40 ($\Delta a_e$), etc. According to one example, block 420 occurs once training is complete (e.g., following 1500 episodes in the example above). In another example, block 420 occurs after a threshold quantity of episodes (e.g., following 500 episodes in the example above). And according to at least one example, block 420 occurs at least partially concurrently with block 310 (illustrated using a dashed line in FIG. 4 looping process 300 back to block 310)—e.g., dataset may be generated repeatedly (and used in block 330 which follows) while the RLA controller 12 is being trained.

In block 430, the fuzzy controller 14 receives the RLA dataset (of block 420) and the sensor input to generate a model, e.g., fuzzy rules, therefrom. More particularly, fuzzy controller 14 may determine a non-linear model that can be used to map the RLA dataset to the sensor input. In one or more examples, the fuzzy controller 14 uses Evolving Takagi-Sugeno (ETS) modeling. This is merely illustrative and in other implementations, other types of fuzzy controller systems can be used instead. Thus, continuing with the ETS model example, fuzzy controller 14 may determine a set of fuzzy rules ($\Re$), wherein the $i^{th}$ rule has the form of Equation (7) for an n-dimensional input vector x.

$$\Re_i: \text{IF } x_1=A_1 \text{ and IF } x_2=A_2 \text{ and } \ldots \text{ and IF } x_n=A_n,$$
$$\text{THEN } y_i=\alpha_{i0}+\alpha_{i1}x_1+\alpha_{i2}x_2+\ldots+\alpha_{in}x_n \quad \text{Equation (7)}$$

Wherein y for all i is defined by Equation (8) below.

$$y = \frac{\sum_{i=1}^{\mathcal{R}} \tau_i y_i}{\sum_{i=1}^{\mathcal{R}} \tau_i} \quad \text{Equation (8)}$$

Wherein $\tau_i$ is a firing level of the $i^{th}$ rule and may be defined by Equations (9) and (10).

$$\tau_i=\mu_{i1}(x_1)*\mu_{i2}(x_2)*\ldots*\mu_{in}(x_n) \quad \text{Equation (9)}$$

$$\mu_{ij}=e^{-\alpha\|x_j-x_{ij}^*\|^2} \quad \text{Equation (10)}$$

Wherein $\mu_{ij}$ represents a Gaussian-like measure of similarity between a given input value $x_j$ and a focal point $x_{ij}^*$ characterizing a typicality of the same input.

As shown in FIG. 4, generating fuzzy rules (block 330) may comprise block 440 (learning rule antecedents) and block 450 (estimating rule consequents). Learning rule antecedents (block 440) may include determining data focal points (f) (e.g., so-called 'centers' of fuzzy data clusters) and zones of influence (e.g., so-called 'radii' (r) of the respective clusters) that summarize each relevant state in a data space. The rule antecedent may decompose an input space, e.g., sensor data, into regions that correspond to different operating conditions, e.g., state-action values, where the linear sub-models may provide local approximation; note however: the aggregation of these linear sub-models may be non-linear. In block 450, a plurality of coefficients of these linear sub-models (e.g., linear equations) may be determined using a pseudo-inversion technique or by applying a Recursive Least Squares (RLS) optimization technique.

Following block 430, the extracted rule antecedents (of block 440) and rule consequents (of block 450) may be combined to yield (in block 460) a set of interpretable fuzzy rules (e.g., a complete fuzzy rule basis ($\mathbb{R}$)).

Figure 8:
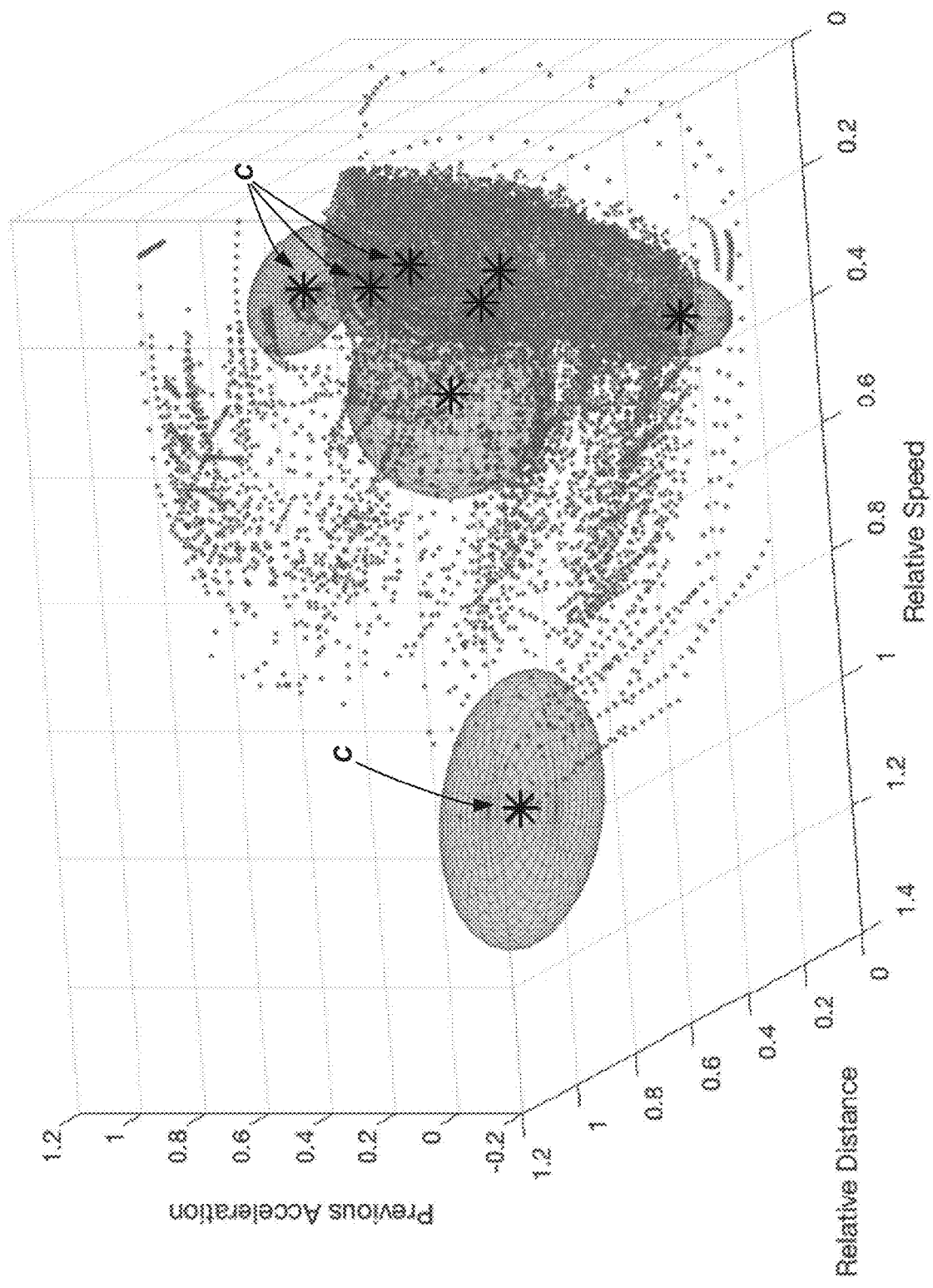
FIG. 8 is a graphical depiction of clustered data determined by the fuzzy controller.

By way of example only (and using a dataset computed by an example RLA controller), blocks 430-460 will be illustrated. In the example, the fuzzy controller 14 may use ETS modeling—using the following parameters: r=0.3, ρ=0.3, and ε=0.05, wherein $\alpha_{i0}=0$. FIG. 8 illustrates that using an example dataset (wherein the axes represent a relative distance, a relative speed, and a previous acceleration), fuzzy controller 14 obtained (by clustering the input space) eight clusters (C) defined by normalized focal points (f) and normalized radii (r). Equations (11)-(18), which follow, illustrates an example complete fuzzy rule basis ($\mathbb{R}$) learned using the example ETS model, wherein each rule antecedent comprises a focal point (f) and a corresponding radius (r), wherein each rule consequent comprises a plurality of coefficients ($\alpha_{i1}, \alpha_{i2}, \ldots, \alpha_{in}$) for a linear output of the ETS model.

$$\mathbb{R}_1: \text{IF } x_1 \sim \mu_{(f=0.40)}^{(r=0.14)} \text{ and } x_2 \sim \mu_{(f=0.46)}^{(r=0.16)} \text{ and}$$
$$x_3 \sim \mu_{(f=0.60)}^{(r=0.30)} \text{ THEN } y_1=7.36, \alpha_{i2}=-9.73,$$
$$\text{and } \alpha_{i3}=1.68. \quad \text{Equation (11)}.$$

E.g., wherein $\alpha_{i1}=7.36$, $\alpha_{i2}=-9.73$, and $\alpha_{i3}=1.68$.

$$\mathbb{R}_2: \text{IF } x_1 \sim \mu_{(f=0.44)}^{(r=0.19)} \text{ and } x_2 \sim \mu_{(f=0.29)}^{(r=0.19)} \text{ and}$$
$$x_3 \sim \mu_{(f=0.99)}^{(r=0.06)} \text{ THEN } y_2=0.11x_1-1.13x_2+$$
$$2.14x_3 \quad \text{Equation (12)}.$$

E.g., wherein $\alpha_{i1}=0.11$, $\alpha_{i2}=-1.13$, and $\alpha_{i3}=2.14$.

$$\mathbb{R}_3: \text{IF } x_1 \sim \mu_{(f=0.36)}^{(r=0.09)} \text{ and } x_2 \sim \mu_{(f=0.30)}^{(r=0.08)} \text{ and}$$
$$x_3 \sim \mu_{(f=0.85)}^{(r=0.07)} \text{ THEN } y_3=7.79x_1-12.11x_2+$$
$$2.57x_3 \quad \text{Equation (13)}.$$

E.g., wherein $\alpha_{i1}=7.79$, $\alpha_{i2}=-12.11$, and $\alpha_{i3}=2.57$.

$$\mathbb{R}_4: \text{IF } x_1 \sim \mu_{(f=0.23)}^{(r=0.06)} \text{ and } x_2 \sim \mu_{(f=0.38)}^{(r=0.06)} \text{ and}$$
$$x_3 \sim \mu_{(f=0.00)}^{(r=0.015)} \text{ THEN } y_4=0.08x_1-5.17x_2+$$
$$0.86x_3 \quad \text{Equation (14)}.$$

E.g., wherein $\alpha_{i1}=0.08$, $\alpha_{i2}=-5.17$, and $\alpha_{i3}=0.86$.

$$\mathbb{R}_5: \text{IF } x_1 \sim \mu_{(f=0.29)}^{(r=0.06)} \text{ and } x_2 \sim \mu_{(f=0.28)}^{(r=0.05)} \text{ and}$$
$$x_3 \sim \mu_{(f=0.79)}^{(r=0.12)} \text{ THEN } y_5=-2.46x_1+0.83x_2+$$
$$1.98x_3 \quad \text{Equation (15)}.$$

E.g., wherein $\alpha_{i1}=-2.46$, $\alpha_{i2}=0.83$, and $\alpha_{i3}=1.98$.

$$\mathbb{R}_6: \text{IF } x_1 \sim \mu_{(f=0.29)}^{(r=0.05)} \text{ and } x_2 \sim \mu_{(f=0.34)}^{(r=0.07)} \text{ and}$$
$$x_3 \sim \mu_{(f=0.57)}^{(r=0.07)} \text{ THEN } y_6=1.95x_1-6.92x_2+$$
$$3.26x_3 \quad \text{Equation (16)}.$$

E.g., wherein $\alpha_{i1}=1.95$, $\alpha_{i2}=-6.92$, and $\alpha_{i3}=3.26$.

$$\mathbb{R}_7: \text{IF } x_1 \sim \mu_{(f=0.29)}^{(r=0.04)} \text{ and } x_2 \sim \mu_{(f=0.29)}^{(r=0.04)} \text{ and}$$
$$x_3 \sim \mu_{(f=0.51)}^{(r=0.08)}$$

$$\mathbb{R}_7: \text{IF } x_1 \sim \mu_{(f=0.29)}^{(r=0.04)} \text{ and } x_2 \sim \mu_{(f=0.29)}^{(r=0.21)} \text{ and}$$
$$x_3 \sim \mu_{(f=0.02)}^{(r=0.11)} \text{ THEN } y_7=-0.53x_1-3.81x_2+$$
$$2.27x_3 \quad \text{Equation (17)}.$$

E.g., wherein $\alpha_{i1}=-0.53$, $\alpha_{i2}=-3.81$, and $\alpha_{i3}=2.27$.

$$\mathbb{R}_8: \text{IF } x_1 \sim \mu_{(f=0.89)}^{(r=0.27)} \text{ and } x_2 \sim \mu_{(f=1.00)}^{(r=0.04)} \text{ and}$$
$$x_3 \sim \mu_{(f=0.51)}^{(r=0.08)} \text{ THEN } y_8=-2.20x_1=0.70x_2+$$
$$4.20x_3 \quad \text{Equation (18)}.$$

E.g., wherein $\alpha_{i1}=-2.20$, $\alpha_{i2}=-0.70$, and $\alpha_{i3}=4.20$.

Thus, the dataset of block 420 may be modeled by interpretable, e.g., human interpretable equations—e.g., according to the IF-THEN statements constructed by the fuzzy controller 14.

In block 495, autonomous driving system 42 may execute a vehicle function. Continuing with the present example, system 42 may use the output of block 420 or block 460 to maintain the vehicle 40 at a suitable distance ($l_d$) behind the lead vehicle 70 in the ACC mode. For example, this outputted data may be sent to computers 60 or 62 to control vehicle acceleration or braking, respectively. Thereafter, the process 400 may loop back to block 405 or end.

The process 400 described above may achieve similar or even better performance than known systems. For example, the RLA controller 12 described above may have better performance than the so-called Gipps controller [P. G. Gipps, "A behavioural car-following model for computer simulation," *Transportation Research Part B: Methodological*, vol. 15, no. 2, pp. 105-111, 1981] or the Intelligent Driver Model or IDM controller [M. Treiber, A. Hennecke, and D. Helbing, "Congested traffic states in empirical observations and microscopic simulations," *Physical review* E, vol. 62, no. 2, p. 1805, 2000]. By way of example, the Gipps controller utilizes Equations (19) and (20) below.

$$e_{v_{des}}(t+\Delta t) = \min[e_v(t) + a_{nom}\Delta t, e_{v0}, e_{v_{safe}}(d_r, l_v)] \quad \text{Equation (19)}.$$

Wherein $e_{v_{des}}(t+\Delta t)$ is a desired velocity of vehicle 40 (e.g., 'ego' (e) vehicle) at a time t+Δt, wherein $e_v(t)$ is a current velocity of vehicle 40, wherein $a_{nom}$ is a nominal acceleration, wherein $e_{v0}$ is a maximum speed sent by a user of vehicle 40 (e.g., via a cruise control user interface (not shown) of vehicle 40), wherein $e_{v_{safe}}$ is a calculated speed that is based on a relative distance ($d_r$) between the vehicles 40, 70 and a relative speed ($l_v$) of lead vehicle 70. Note: $d_r=(l_d)$, wherein the relative distance is the same as the position of the lead vehicle 70.

$$a_{e_{des}}(t+\Delta t) = a_{nom}\left[1 - \left(\frac{e_v(t)}{e_{v0}}\right)^\delta - \left(\frac{d^*(e_v, \Delta v)}{r_d}\right)^2\right] \quad \text{Equation (20)}$$

Wherein $a_{e_{des}}(t+\Delta t)$ is a desired acceleration of vehicle 40 at a time t+Δt, wherein δ is an acceleration exponent, wherein d' is a desired distance between vehicles 40, 70, wherein $e_v(t)$ is a function of the velocity of vehicle 40, wherein Δv is defined by $\Delta v = e_v - l_v$, wherein $r_d$ is relative distance.

Figure 9:
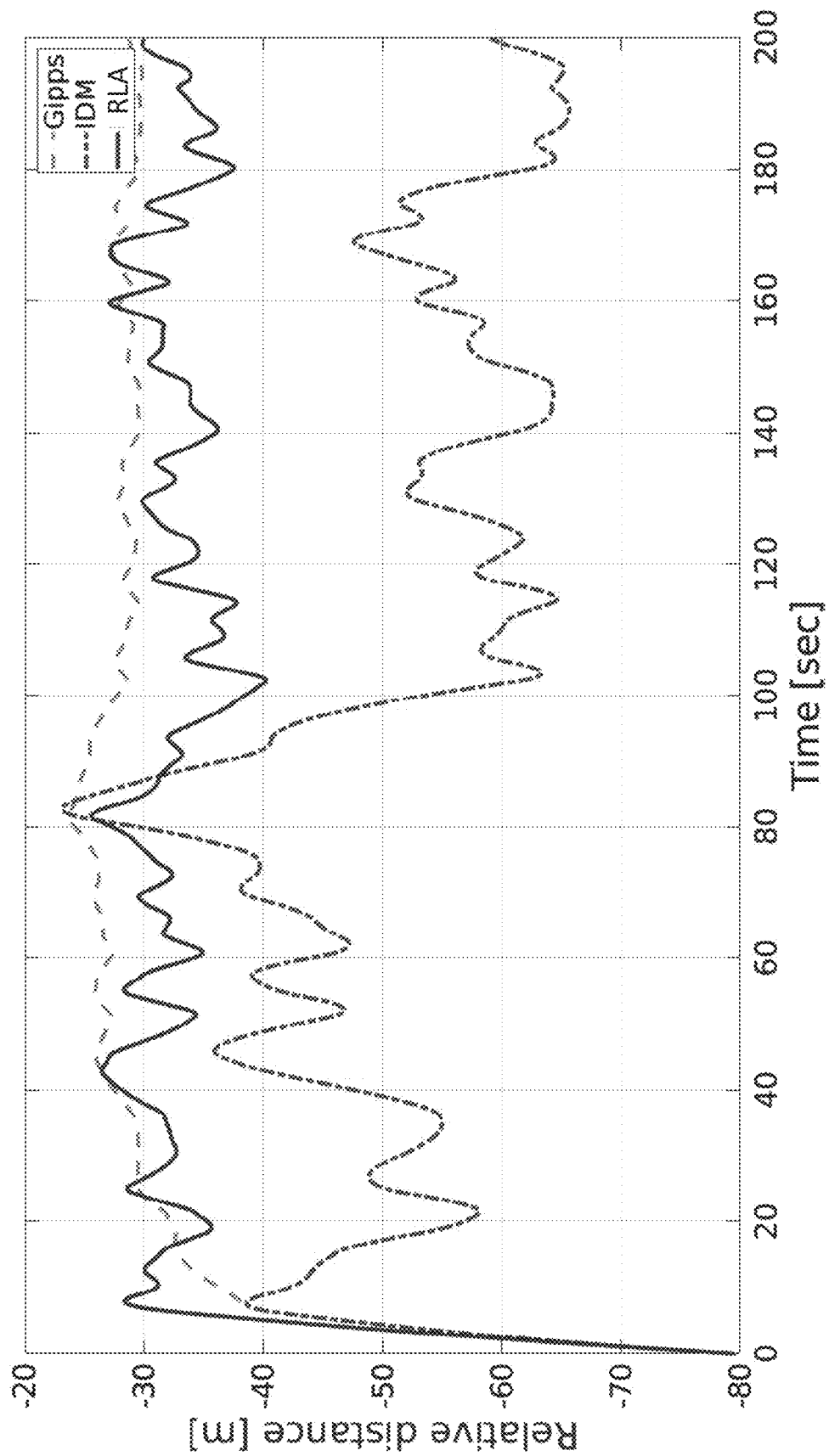
FIG. 9 is a graphical depiction of a distance over a time interval between an ego vehicle and a lead vehicle.
Figure 10:
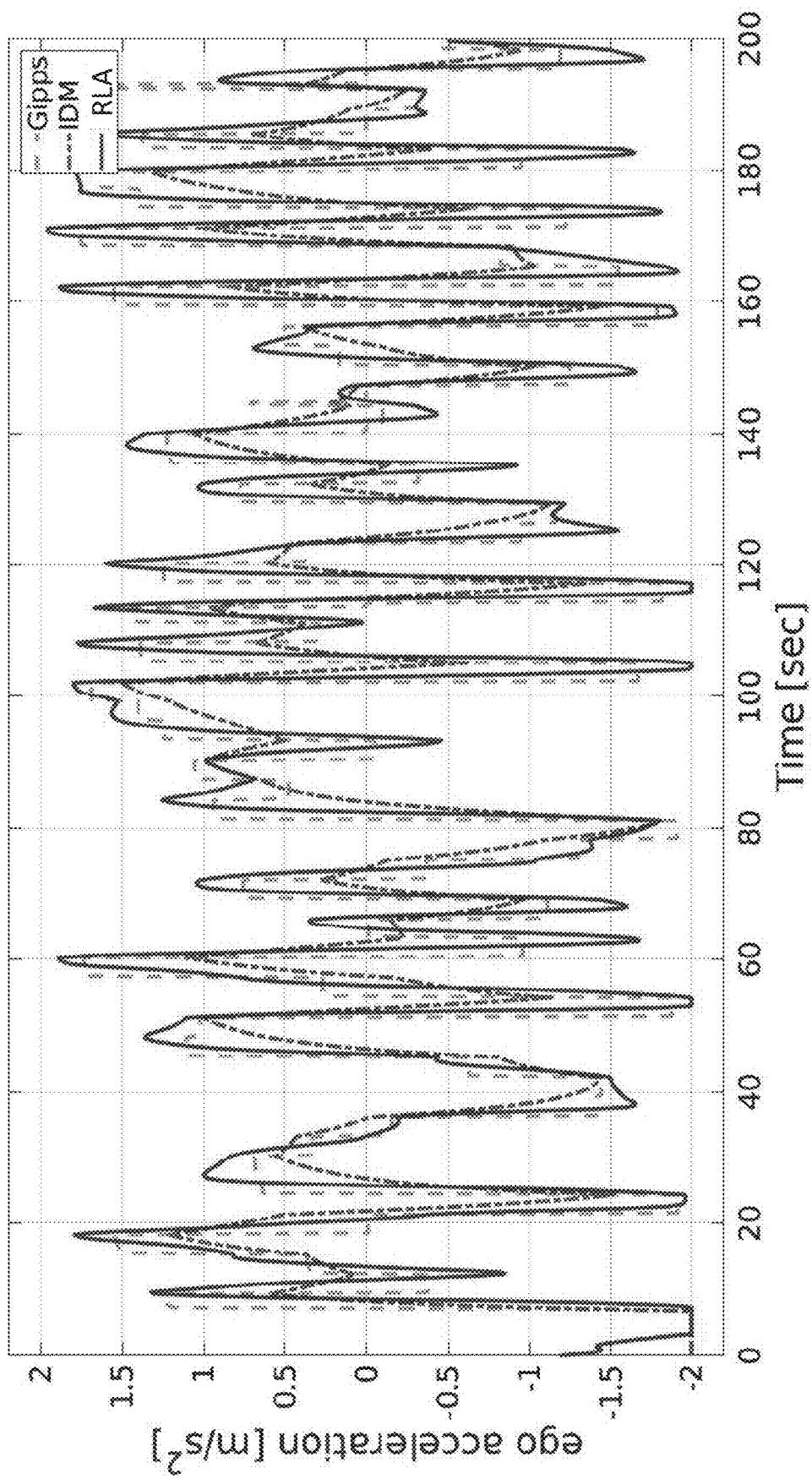
FIG. 10 is a graphical depiction of changes in acceleration of the ego vehicle over the time interval of FIG. 9.

As shown in FIG. 9, the Gipps' controller may maintain a nearly constant gap to the lead vehicle; however, as shown in FIG. 10, the Gipps' controller may cause an undesirable acceleration profile. In FIG. 9, the IDM controller demonstrates an undesirably large variation in the distance to the lead vehicle-primarily due to a slower system response. Turning to the relative performance of the RLA controller 12, the vehicle 40 maintains a consistent distance between it and the lead vehicle 70 (FIG. 9), while also demonstrating a smoother acceleration profile (FIG. 10). E.g., this may be due to using a relatively large penalty for large variations in acceleration. Thus, the RLA controller 12 outperforms the Gipps and IDM controllers.

Similarly, for example, the fuzzy controller 14 described above may yield a similar acceleration profile as a controller that uses an ETS Fuzzy Rule-Based (FRB) system. Further, computational time may be similar. For example, according to one study a time per decision-making step for the fuzzy controller 14 was 0.3 milliseconds (ms) whereas the time per decision-making step for the ETS FRB was 0.13 ms.

As stated above, the adaptive cruise control mode was merely an example. Other automotive and non-automotive implementations exist.

Thus, there has been described a machine learning system that includes a fuzzy controller that receives a dataset, such as a plurality of state-action values, from a reinforcement learning agent (RLA) controller. The controllers may be embodied in software, in hardware, or in a combination thereof. By using the two controllers in series, wherein the output of the RLA controller (data) is received as input to the fuzzy controller, a machine learning system can be created wherein the output data is interpretable using the fuzzy controller. In this manner, engineers, system designers, etc. may more fully appreciate and/or troubleshoot their implementations.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
    calculating, via a reinforcement learning agent (RLA) controller, a plurality of state-action values based on sensor data representing an observed state, wherein the RLA controller utilizes a deep neural network (DNN);
    wherein the RLA controller uses, to calculate the state-action values, (i) a first reward that is a function of a user-selected maximum velocity for a vehicle, (ii) a second reward that is a function of a headway parameter representing a distance between the vehicle and a second vehicle, and (iii) a third reward that is a function of a change in acceleration of the vehicle and a predetermined allowable acceleration for the vehicle;
    generating, as output from a fuzzy controller arranged in series with the RLA controller to receive as input the state-action values output by the RLA controller, a plurality of linear models mapping the plurality of state-action values to the sensor data; and
    actuating an agent based on at least one of the plurality of state-action values or the plurality of linear models;
    wherein the agent includes the vehicle and wherein actuating the agent further comprises adjusting a speed of the vehicle based on at least one of the plurality of state-action values or the plurality of linear models.

2. The method of claim 1, wherein the plurality of state-action values correspond to an optimal policy generated during reinforcement learning training.

3. The method of claim 1, wherein the vehicle is an autonomous vehicle.

4. The method of claim 1, wherein the plurality of linear models comprise a set of IF-THEN rules mapping the plurality of state-action values to the sensor data.

5. The method of claim 1, wherein the fuzzy controller uses an Evolving Takagi-Sugeno (ETS) model to generate the plurality of linear models.

6. The method of claim 1, further comprising: determining, via the fuzzy controller, one or more data clusters corresponding to the sensor data, wherein each of the one or more data clusters comprises a focal point and a radius.

7. A system, comprising:
    at least one processor; and
    at least one memory, wherein the at least one memory stores instructions executable by the at least one processor such that the at least one processor is programmed to:
    calculate, via a reinforcement learning agent (RLA) controller that utilizes a deep neural network, a plurality of state-action values based on sensor data representing an observed state;
    wherein the RLA controller uses, to calculate the state-action values, (i) a first reward that is a function of a user-selected maximum velocity for a vehicle, (ii) a second reward that is a function of a headway parameter representing a distance between the vehicle and a second vehicle, and (iii) a third reward that is a function of a change in acceleration of the vehicle and a predetermined allowable acceleration for the vehicle;
    generate, as output from a fuzzy controller arranged in series with the RLA controller to receive as input the state-action values output by the RLA controller, a plurality of linear models mapping the plurality of state-action values to the sensor data; and
    actuate an agent based on at least one of the plurality of state-action values or the plurality of linear models;
    wherein the agent includes the vehicle and wherein actuating the agent further comprises adjusting a speed of the vehicle based on at least one of the plurality of state-action values or the plurality of linear models.

8. The system of claim 7, wherein the plurality of state-action values correspond to an optimal policy generated during reinforcement learning training.

9. The system of claim 7, wherein the vehicle is an autonomous vehicle.

10. The system of claim 7, wherein the plurality of linear models comprise a set of IF-THEN rules mapping the plurality of state-action values to the sensor data.

11. The system of claim 7, wherein the processor is further programmed to generate the plurality of linear models using an Evolving Takagi-Sugeno (ETS) model.

12. The system of claim 7, wherein the processor is further programmed to determine one or more data clusters corresponding to the sensor data, wherein each of the one or more data clusters comprises a focal point and a radius.

* * * * *